US012709927B2

(12) United States Patent
Spießl

(10) Patent No.: US 12,709,927 B2
(45) Date of Patent: Aug. 18, 2026

(54) MECHANISM FOR A DOOR OF AN ELECTRICAL HOUSEHOLD APPLIANCE

(71) Applicant: emz-Hanauer GmbH & Co. KGaA, Nabburg (DE)

(72) Inventor: Georg Spießl, Altendorf (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 182 days.

(21) Appl. No.: 18/652,861

(22) Filed: May 2, 2024

(65) Prior Publication Data

US 2024/0410210 A1 Dec. 12, 2024

(30) Foreign Application Priority Data

Jun. 7, 2023 (DE) ......................... 102023114980.6

(51) Int. Cl.
*E05C 19/06* (2006.01)
*E05B 17/00* (2006.01)

(52) U.S. Cl.
CPC .......... *E05C 19/06* (2013.01); *E05B 17/0029* (2013.01)

(58) Field of Classification Search
CPC .. E05B 17/0029; E05B 17/0025; E05B 17/22; E05B 65/00; E05B 63/22; E05B 47/0001; E05B 9/02; E05B 2047/0067; E05B 2047/0068; E05B 2047/0036; E05C 19/06; E05Y 2201/10; E05Y 2201/22; E05Y 2201/42; E05Y 2201/62; E05Y 2600/502; E05Y 2600/52; E05Y 2600/53; E05Y 2600/60; E05Y 2600/626;
(Continued)

(56) References Cited

U.S. PATENT DOCUMENTS 5,882,739 A * 3/1999 Kobos ...................... A47L 15/48 264/483
7,044,412 B2 * 5/2006 Hemond ............... E05F 15/697 242/390.8

(Continued)

FOREIGN PATENT DOCUMENTS

CH 673856 A5 * 4/1990 ............. D06F 39/14
CN 102883646 B * 7/2015 ........... A47L 15/488

(Continued)

*Primary Examiner* — Steven A Tullia
(74) *Attorney, Agent, or Firm* — Tarolli, Sundheim, Covell & Tummino LLP

(57) ABSTRACT

A mechanism for a door of an electrical household appliance includes an opener for pushing open the door, wherein the opener includes an opener housing and, accommodated therein, a pusher arranged for a linear push-open movement and an electric motor drive for the pusher, and a latch for holding the door closed, wherein the latch includes a latch housing and, accommodated therein, at least one movably arranged closing element, which is provided for engagement, holding the door closed, with a counter-body approaching the closing element when the door is closed. The opener housing and the latch housing each have a coupling section which cooperate to mechanically couple the opener housing and the latch housing. Furthermore, the opener housing has at least one first fastening means designed to fasten the mechanism to the electrical household appliance when the coupling sections of the opener housing and the latch housing are mechanically coupled.

16 Claims, 4 Drawing Sheets

(58) Field of Classification Search

CPC ........... E05Y 2800/23; E05Y 2800/242; E05Y 2800/73; E05Y 2900/308; E05Y 2900/312; E05F 15/616; E05F 15/619; E05F 15/00; E05F 15/10; F24C 15/022; A47L 15/4259; A47L 15/4257; D06F 39/14; Y10T 292/1084; Y10T 292/0863; Y10T 292/1043; Y10T 292/1062; Y10T 292/1021; Y10S 292/04; Y10S 292/69; Y10S 292/65

See application file for complete search history.

(56) References Cited

U.S. PATENT DOCUMENTS

| | | | | |
|---|---|---|---|---|
| 7,654,590 | B2 * | 2/2010 | Hapke | A47L 15/4259<br>134/58 DL |
| 9,084,526 | B2 * | 7/2015 | Assmann | A47L 15/4259 |
| 9,474,433 | B2 * | 10/2016 | Unverdi | A47L 15/488 |
| 9,605,464 | B2 * | 3/2017 | Kessler | H02K 1/17 |
| 9,885,141 | B2 * | 2/2018 | Becchio | E05B 47/0009 |
| 10,161,164 | B2 * | 12/2018 | Kang | E06B 7/16 |
| 10,986,976 | B2 * | 4/2021 | Nearpass | A47L 15/4259 |
| 11,179,020 | B2 * | 11/2021 | Spiessl | E05F 15/619 |
| 11,536,070 | B2 * | 12/2022 | Drzazga | E05F 1/10 |
| 11,788,340 | B2 * | 10/2023 | Walz | E05B 17/0029<br>292/144 |
| 11,889,965 | B2 * | 2/2024 | Dirnberger | A47L 15/4259 |
| 12,349,851 | B2 * | 7/2025 | Dirnberger | A47L 15/4259 |
| 12,398,582 | B2 * | 8/2025 | Dirnberger | E05B 47/0012 |
| 2006/0283482 | A1 * | 12/2006 | Berends | A47L 15/0034<br>134/25.2 |
| 2009/0265993 | A1 * | 10/2009 | Shah | E05F 11/488<br>49/502 |
| 2010/0223852 | A1 * | 9/2010 | Arimoto | E05F 15/689<br>24/304 |
| 2024/0328231 | A1 * | 10/2024 | Bauriedl | E05F 15/63 |
| 2025/0213094 | A1 * | 7/2025 | Ahn | A47L 15/0034 |

FOREIGN PATENT DOCUMENTS

| | | | | | |
|---|---|---|---|---|---|
| CN | 108457049 | A | * | 8/2018 | D06F 39/14 |
| CN | 112006625 | A | * | 12/2020 | A47L 15/0034 |
| CN | 108661455 | B | * | 5/2021 | E05B 65/00 |
| CN | 110946538 | B | * | 7/2021 | A47L 15/4259 |
| CN | 113236063 | A | | 8/2021 | |
| DE | 4116528 | A1 | * | 4/1992 | D06F 37/42 |
| DE | 19837248 | A1 | | 2/2000 | |
| DE | 102006037494 | A1 | | 2/2008 | |
| DE | 102011003818 | A1 | * | 8/2012 | A47L 15/4259 |
| DE | 102016101800 | A1 | * | 8/2016 | A47L 15/4259 |
| DE | 102016008044 | A1 | | 1/2018 | |
| DE | 102020124399 | B3 | | 10/2021 | |
| DE | 102021104747 | A1 | | 9/2022 | |
| DE | 102022116078 | A1 | | 12/2023 | |
| DE | 102022116999 | A1 | | 1/2024 | |
| EP | 2591712 | A1 | * | 5/2013 | A47L 15/4259 |
| EP | 2845532 | A1 | * | 3/2015 | A47L 15/4259 |
| ES | 2689727 | T3 | * | 11/2018 | E05B 13/108 |
| KR | 20220027675 | A | * | 3/2022 | E05F 15/614 |
| RU | 2642401 | C2 | * | 1/2018 | D06F 37/42 |
| WO | WO-2011080085 | A2 | * | 7/2011 | E05B 17/0029 |
| WO | WO-2016020082 | A1 | * | 2/2016 | A47L 15/4261 |
| WO | WO-2018069103 | A1 | * | 4/2018 | E05F 15/622 |
| WO | WO-2020126491 | A1 | * | 6/2020 | D06F 39/14 |
| WO | WO-2022121078 | A1 | * | 6/2022 | A47L 15/42 |

* cited by examiner

MECHANISM FOR A DOOR OF AN ELECTRICAL HOUSEHOLD APPLIANCE

CROSS-REFERENCE TO RELATED APPLICATIONS

This patent application claims the benefit of and priority to German Patent Application No. 102023114980.6, filed on Jun. 7, 2023, which is herein incorporated by reference in its entirety.

FIELD OF THE DISCLOSURE

The invention relates to a mechanism for a door of an electrical household appliance.

BACKGROUND

Electrical household appliances such as washing machines, dishwashers, washer-dryers (i.e., combination appliances for washing and drying laundry), ovens, and the like have a working chamber, which can be closed by a door. To keep the door closed, these household appliances are equipped with a latch, which, when the door is closed, engages with an approaching counter-body and holds it captive in a closed state of the latch. In its closed state, the latch usually opposes the opening of the door with a certain resistance (closing holding force), which results from the need to initially tension a closing spring arrangement of the latch more strongly when the door is opened until the counter-body is finally released from the latch again.

SUMMARY

In household appliances such as washing machines and dishwashers, the use of openers that allow the closed door to be opened in a controlled manner without the user having to pull on the door manually is also becoming increasingly widespread. Such an opener function, which can be purely programme-controlled or executed by a user on input of a corresponding opener command, allows the door to be opened a crack after completion of a work programme of the household appliance (e.g., to allow moisture to escape from the work area and/or to allow the work area to cool down more quickly).

For easier installation, the latch and opener can be designed as a common assembly in some household appliances. This saves an additional work step by mounting the opener separately, for example. Furthermore, the latch and opener can be accommodated in a common housing.

However, the latch and opener have functional differences that also affect the respective housing sections of the common housing.

Accordingly, it is a task of the invention to show a way in which the functional integrity of the individual units can be maintained despite the structural combination of latch and opener.

To solve this task, a mechanism for a door of an electrical household appliance is provided according to the invention, comprising an opener for pushing the door open, wherein the opener comprises an opener housing and, accommodated therein, a pusher arranged for an in particular linear push-open movement and a drive for the pusher, in particular an electric motor drive; and a latch for holding the door closed, wherein the latch comprises a latch housing and, accommodated therein, at least one movably arranged closing element, wherein the at least one closing element is provided for engagement, holding the door closed, with a counter-body approaching the closing element when the door is closed.

In such a mechanism, the opener housing and the latch housing each have a coupling section which cooperate to effect a mechanical coupling of the opener housing and the latch housing, and the opener housing has at least one first fastening means which is arranged to fasten the mechanism to the electrical household appliance when the coupling sections of the opener housing and the latch housing are mechanically coupled. This ensures that both the opener and the latch receive the housing required for their respective functions. In other words, the housing for the opener and the latch can be optimized for their respective functions.

Furthermore, assembly remains simple and quick, as only one assembly step is required to attach the opener housing to the household appliance. For example, the latch housing can be pre-assembled to the opener housing via the cooperating coupling sections, while the assembled unit (the mechanism) can be attached to the household appliance.

According to certain embodiments, the opener housing and the latch housing may be made of different materials. While the different materials may both be a plastic, different plastics or plastic compositions are possible for each of the two housings. Of course, at least a section of one or both of the housings (opener housing and/or latch housing) can also be made of metal or comprise an internal or external metal coating or a metal core.

For example, components of the opener are exposed to greater forces than components of the latch. In particular, higher forces are applied in the opener than by the movable closing element due to the pusher overcoming the closed-holding engagement of the at least one closing element. The opener housing can therefore be made of a material that is designed for these higher forces. The opener housing can also be optimised to accommodate the electric motor drive or to guide other components such as gear elements. On the other hand, components of the latch can be moved in the latch housing, whereby they are guided through the latch housing. The resulting friction can be reduced by selecting the appropriate material for the latch housing. If a common housing were to be provided for the opener and latch, this would not be able to fulfil the different tasks.

According to certain embodiments, the opener housing comprises a reinforced, in particular glass fibre-reinforced, material. Due to the reinforcement in the material of the opener housing, the higher forces of the opener components can be absorbed. This makes the opener more durable. Furthermore, smaller tolerances and smaller deformations can be achieved.

Alternatively, or additionally, the latch housing can be a low-friction material. For example, the latch housing can comprise polyoxymethylene (POM). This facilitates the movement of the latch components in the latch housing, which on the one hand also increases the longevity of the latch. On the other hand, a user of the household appliance will feel a smooth movement of the latch when manually opening and closing the door. By way of example only, it should be mentioned that glass fibre reinforced plastics have a higher friction, so that the material of the opener housing is less suitable for the latch housing.

According to certain embodiments, at least one of the coupling sections can form an arresting means. By arresting means is meant here a mechanical connection between the opener housing and the latch housing, which prevents or blocks the latch housing from being released from the opener housing in at least one direction. By way of example only, the arresting means may comprise an undercut, lug, catch, rail, and/or a clamping hook. Of course, both housings can have coupling sections that form corresponding arresting means. For example, the latch housing can only be detached from the opener housing by releasing a catch formed by the arresting means, optionally also with the aid of a corresponding tool.

According to certain embodiments, the opener housing can have at least one second fastening means, which is set up to attach the mechanism to the electrical household appliance when the coupling sections of the opener housing and the shutter housing are mechanically coupled. Thus, at least a two-point fixation of the mechanism to the electrical household appliance can be achieved, while the latch does not have to be fastened separately to the electrical household appliance. Rather, the latch is attached via the opener housing or held via the coupling sections.

Alternatively, or additionally, the latch housing can have at least one third fastening means, which is set up to attach the mechanism to the electrical household appliance when the coupling sections of the opener housing and the latch housing are mechanically coupled. This also allows at least two-point fixation of the mechanism to the electrical household appliance (the term “third fastening means” is not intended to define the number of fastening points as three, but merely serves to distinguish the second fastening means on the opener housing). The mechanism can only be securely fastened to the electrical household appliance in the interaction between the opener housing and the connector housing. Due to the mechanical coupling between the opener housing and the latch housing, both housings form an assembly for the mechanism, which can be attached to the electrical household appliance via the two fastening means (first fastening means on the opener housing and third fastening means on the latch housing).

Alternatively, or additionally, the opener housing and the latch housing can also each have a further coupling section, which interact to provide a further mechanical coupling of the opener housing and the latch housing. In particular, the (first) coupling section and the further (second) coupling section can be arranged on different sides of the latch housing, preferably on opposite sides of the latch housing. This enables the latch housing to be securely fastened to the opener housing. On the one hand, there is no need to attach the latch housing separately to the electrical household appliance. On the other hand, the latch housing coupled in this way can also be attached to the electrical household appliance via a corresponding third fastening means.

According to certain embodiments, the mechanism may further comprise a door sensor arranged in the opener housing. The latch may comprise a movable element adapted to transmit a movement of the door to a portion of the movable element cooperating with the door sensor when the door is closed. The door sensor can be, for example, a microswitch, light sensor, motion sensor, touch sensor, proximity sensor, or similar element, which can detect an associated change through a movement of the section of the movable element. For example, the section of the movable element can move the microswitch between two switching positions. Similarly, the section of the movable element can cover a light sensor, motion sensor, touch sensor, proximity sensor, etc., in a first position, touch it, approach it, and be located away from it in a second position. By way of example only, the first position may be occupied by the movable element when the door is in its latching position (when the latch is holding the door closed), and the second position may be occupied by the movable element when the door is open.

According to certain embodiments, the movable element may comprise a rocker arm and/or a slider. In this case, the section of the movable element cooperating with the door sensor may be provided on one side or end of the rocker arm and/or the slider. By way of example only, the rocker arm can touch the door at one end as soon as the door has almost reached its latching position up to the latching position of the door. The (small) movement of the door in this area also moves the rocker arm between two positions. An opposite end of the rocker arm, facing away from the door, can form the section of the movable element that interacts with the door sensor. Alternatively, the slider can also be arranged at the end of the rocker arm facing away from the door, so that the end of the rocker arm facing away from the door moves the slider between two positions (e.g., moves it linearly). In this case, the section of the movable element that interacts with the door sensor is formed by a section of the slider.

According to a further embodiment, the movable element can be equipped with a spring element. The spring element can be coupled to the movable element in such a way that it urges the movable element into a position that corresponds to an open position of the door. This means that when the door is closed, the movable element can be moved against the spring force of the spring element, and when the door is opened, the movable element can be moved in the opposite direction due to the spring force of the spring element. This reciprocal movement allows the door sensor to be set to two different states.

According to certain embodiments, the section of the movable element that interacts with the door sensor can be arranged in an area of the latch housing facing away from the door. This allows the door sensor to be arranged in a region of the mechanism that is at a distance from the door. This makes it easier to route the cable to the sensor and to arrange the sensor in the mechanism, as several other components for opening and closing the door must be arranged in the front area of the mechanism (the area of the mechanism facing the door). In other words, the movable element penetrates the latch housing (at least partially) to transmit a movement of the door to the side of the latch housing facing away from the door.

According to certain embodiments, the movable element may comprise a section cooperating with the closing element, which is adapted to mechanically transmit a movement of the closing element to the portion cooperating with the door sensor when the door is closed. Since the closing element, when it engages with the counter-body, is moved by the counter-body when the door is closed, the section of the movable element cooperating with the closing element can pick up this movement and transmit it mechanically to the section of the movable element cooperating with the door sensor. Thus, no sensors or electrical/electronic components are required in the latch.

According to certain embodiments, the movable element may comprise a section protruding from the latch housing, which is adapted to mechanically transmit a movement of the door to the section cooperating with the door sensor when the door is closed. The section protruding from the latch housing can project into an opening of the washing tank (main appliance body), which is closed by the door. As a result, the door touches the protruding section of the movable element shortly before its latching position and moves it along until it reaches its final latching position. The remaining movable element transmits this movement mechanically to the door sensor.

According to certain embodiments, the latch may not comprise any electrical and/or electronic components. In particular, no sensors or electric or electromotive actuators are required in the latch. The latch may be operated and function solely mechanically.

Furthermore, only the opener may comprise an electrical connection. The door sensor, which may be arranged in the opener, may be electrically operated, for example. In particular due to the electric motorised drive for the pusher, an electrical connection must be provided in the opener. A door position can be detected via the movable element in the latch and the door sensor that interacts with it. This means that the entire mechanism can be equipped with a single electrical connection, which is located in any area of the opener housing. Similarly, if necessary, a single printed circuit board of the mechanism can be provided exclusively within the opener housing. For example, the door sensor may be mounted and electrically connected to the printed circuit board.

According to certain embodiments, the latch can have a function for mechanically influencing at least one movement feature of the pusher. This ensures that the latch contributes to the intended functioning of the opener or is even a prerequisite for this.

The at least one movement feature of the pusher can, for example, relate to a blocking of the pusher against extension from an initial position into a feed position required to push open the door as intended. According to certain embodiments, the latch has a function for mechanically releasing such a movement blocking of the pusher. In these embodiments, the latch therefore removes the restriction on the pusher's movement. This means that the latch is required to allow the opener to fulfil its intended function (pushing open the door).

For example, the movement blocking of the pusher is only released by the mechanical coupling of the respective coupling sections of the opener housing and the latch housing. So long as the latch is not attached to or coupled with the opener, the opener cannot be operated as intended in such embodiments.

Alternatively, or additionally, the movement blocking of the pusher can only be released by mounting the latch and the opener on the household appliance as intended. So long as the latch is not mounted on the household appliance or as long as the opener is not mounted on the household appliance, intended operation of the opener is not possible in such embodiments.

In certain embodiments, the latch has a release element which, when the latch and the opener are coupled, pushes a movably arranged blocking element from a latching position, in which the blocking element is positioned to block the pusher, into a release position, in which the blocking element is positioned to release the pusher. The release element can be arranged stationary relative to the latch of the housing; for example, the release element is formed directly by the latch housing. The blocking element can be part of the opener; in this case, it may be necessary to mount the opener on the household appliance to release the movement blocking of the pusher. In these cases, the coupling of the latch with the opener is a prerequisite for the pusher to be released for its intended movement when the mechanism is mounted.

Alternatively, or additionally, the at least one movement feature of the pusher can relate to its guidance in the direction of movement. Accordingly, in certain embodiments, the latch has the function of guiding the movement of the pusher. In this respect, certain embodiments provide for the pusher to be designed as an elongate pusher rod, wherein the latch is designed with a guide lug formed in particular by the latch housing, which is provided for engagement in a guide groove of the pusher rod extending in the longitudinal direction of the rod for the purpose of guiding it longitudinally.

The invention further provides an electrical household appliance comprising an appliance main body and a door movably mounted on the appliance main body for closing an access opening to a working chamber formed in the appliance main body. A mechanism of the type described above is attached to the main body of the appliance.

The invention further provides a method of assembling a household appliance of the type explained, in which method the latch is coupled to the opener and is mounted together as a pre-assembled assembly on the appliance main body.

BRIEF DESCRIPTION OF THE DRAWINGS

The invention is further explained below with reference to the accompanying drawings. They represent.

DETAILED DESCRIPTION

Figure 1:
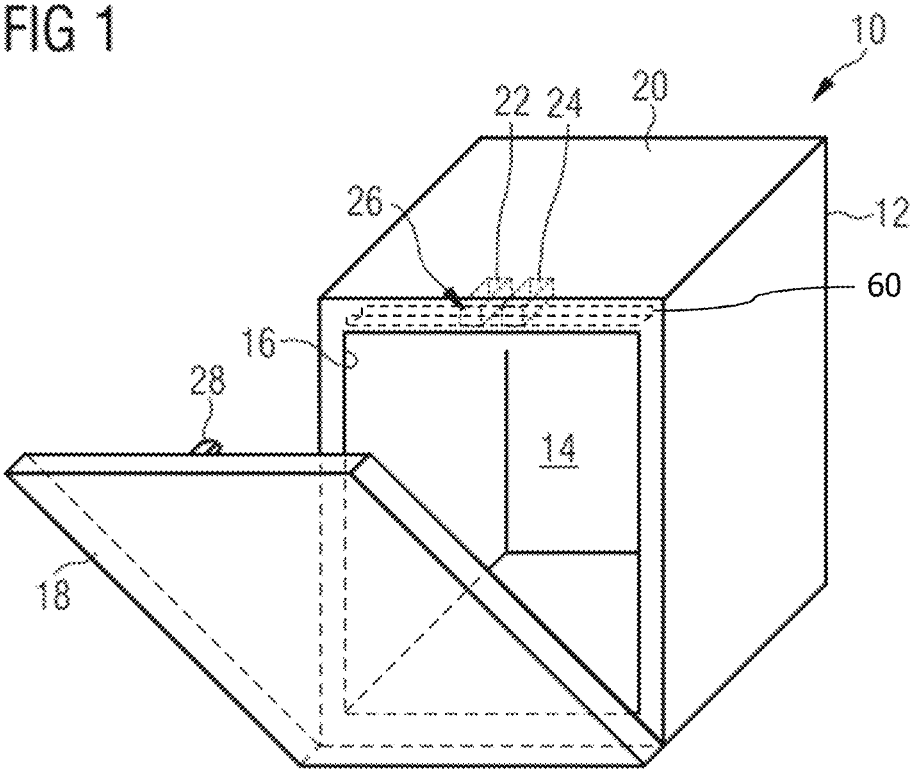
FIG. 1 a schematic of a household dishwasher.

Reference is first made to FIG. 1. The dishwasher shown there, which is intended for use in a private household, is generally labelled 10. It is an example of a household appliance in which a mechanism according to the invention, comprising an opener and a latch, can be used. However, the embodiment example shown in FIG. 1 is in no way intended to limit the field of application of mechanisms according to the invention to dishwashers. The dishwasher 10 comprises a washing tank 12 (main body of the appliance) with a tub 14 formed therein, which is accessible to a user through an access opening 16 at the front. The latter can be closed by a door 18, which is attached to the base area of the washing tank 12 so as to swivel about a horizontal swivelling axis (not shown in detail).

A door mechanism designated 26 is generally installed in the top of the washing tank 12 (designated 20), which has a closing function for keeping the door 18 closed and an opener function for mechanised (i.e., non-manual) opening of the door 18. The closing function is performed by one of the assemblies (in this respect, assembly 22 is assumed below), while the opening function is performed by the other assembly (assembly 24 is assumed below). The assembly 22 can therefore also be referred to as the latch assembly or latch for short, and the assembly 24 as the opener assembly or opener for short. When the door 18 is closed, the latch 22 interacts with a counter-body 28 arranged on the door 18, which in the example shown is in the form of a bracket and which the latch 22 grips and holds in order to keep the door 18 closed.

The door mechanism 26 is built into the tank top (body top) of the washing tank 12, designated 20. In the front of the tank top 20 (i.e., adjacent to the access opening 16), there is a profile rail (generally: reinforcing strip) 60 which extends essentially over the entire front width of the tank top 20 and serves as a stiffening structural element of the tank top 20. In the example shown, the profile rail 60 is designed as an upwardly open U-shaped profile rail. Such a U-shaped design and such an installation position of the profile rail 60 is also assumed in the following figures. However, it is understood that other profile cross-sections of the profile rail 60 and other installation positions are readily conceivable.

Figure 2A:
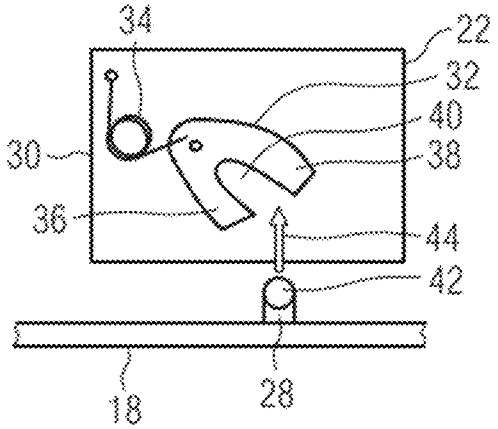
FIG. 2*a* a schematic of a latch for installation in the dishwasher of FIG. 1, FIG. 2*b* a schematic of an opener for installation in the dishwasher of FIG. 1, FIG. 3 a schematic of a mechanism of an opener coupled with a latch, whereby the opener is shown without the housing cover, FIG. 4 a schematic of an exploded view of the mechanism in FIG. 3, FIG. 5 a schematic of a further mechanism consisting of an opener coupled with a shutter, the further mechanism being attached to a profile rail of the household appliance, FIG. 6 a schematic of an exploded view of the further mechanism from FIG. 5, FIG. 7 a schematic of the latch of the further mechanism from FIG. 5, and FIG. 8 a schematic of the opener of the further mechanism from FIG. 5, whereby the opener is shown without the housing cover.

A wide variety of configurations of the latch assembly 22 are conceivable to fulfil the closure function. FIG. 2*a* schematically shows an exemplary embodiment in which the latch 22, accommodated in a latch housing 30, has a rotatably arranged rotary gripper or rotary disc 32 acting as a latching element in the sense of the invention and a latching spring 34 designed as a torsion spring in the example shown. The rotary gripper 32 has a gripper mouth 40 bounded by two jaws 36, 38, into which the counter-body 28 with a central bar 42 plunges when the door 18 is closed (along an arrow direction 44). The central bar 42 thereby abuts against a rear one of the jaws (here the jaw 38) and thereby sets the rotary gripper 32 in rotation. The rotation of the rotary gripper 32 causes the front of the jaws (here the jaw 36) to engage behind the central bar 42 of the counter-body 28, thereby holding the counter-body 28 captive in the gripper mouth 40. Further details of a latch with such a rotary gripper can be found, for example, in DE 198 37 248 A1, DE 10 2016 008 044 B4, or DE 10 2020 124 399 B3; the contents of these documents are hereby incorporated in full into the present disclosure by express reference. An alternative embodiment has an elongate closing body instead of a rotary gripper, which engages with a front gripping nose in a recess formed on the door when the door is closed (see, e.g., DE 10 2006 037 494 B4, the contents of which are hereby also incorporated in full into the present disclosure by express reference).

Figure 2B:
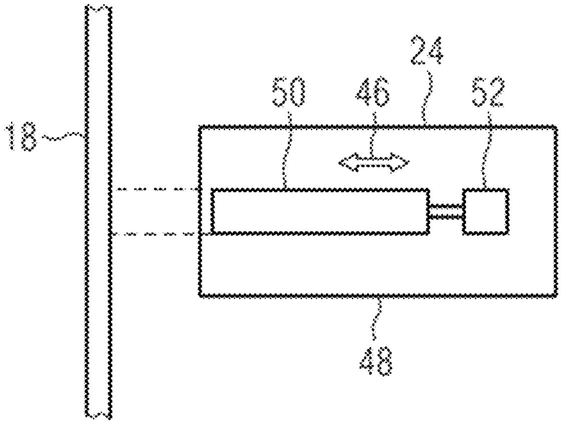

In the latch 22 according to FIG. 2*a*, after the rotary gripper 32 has rotated from its release position shown in FIG. 2*a* into the gripping position in which it holds the counter-body 28 captive, the latching spring 34 counteracts a return rotation of the rotary gripper 32 in the direction of the release position. To open the door 18, this resistance of the latch 22 must therefore be overcome. When opening the door 18 manually, the user must pull on the door 18 with corresponding force in order to overcome the latching force of the latching spring 34. During mechanised opening by means of the opener 24, the necessary force is applied by the opener. For this purpose, as shown in FIG. 2*b*, the opener 24 is designed with a pusher 50 which is accommodated in an opener housing 48 so as to move linearly (along a double arrow 46) and which, in the example shown, is designed in the form of an elongated pusher rod and is mechanically connected to a drive 52 which is also accommodated in an opener housing 48. In certain embodiments, the drive 52 is an electric motor drive with an electric motor and, if necessary, a reduction gear. In such an embodiment of the drive 52, the pusher 50 can be designed with a toothing with which a pinion on the output side of the reduction gear meshes. Alternatively, it is conceivable to design the drive 52 as an electromagnetic drive or as a spring drive, for example. In this respect, the invention is not subject to any limitation.

By actuating the drive 52, the pusher 50 can be moved from a retracted position (initial position) shown in FIG. 2*b* into a feed position indicated by a dashed line. When the opener 24 is installed in the dishwasher 10, such a feeding movement of the pusher 50 leads to the door 18 being pushed open when the door 18 is closed, whereby the opener 24 overcomes the closing holding force of the latch 22. In this case, the pusher 50 can press directly against the door 18 with a front rod tip, as indicated in FIG. 2*b*.

Figure 3:
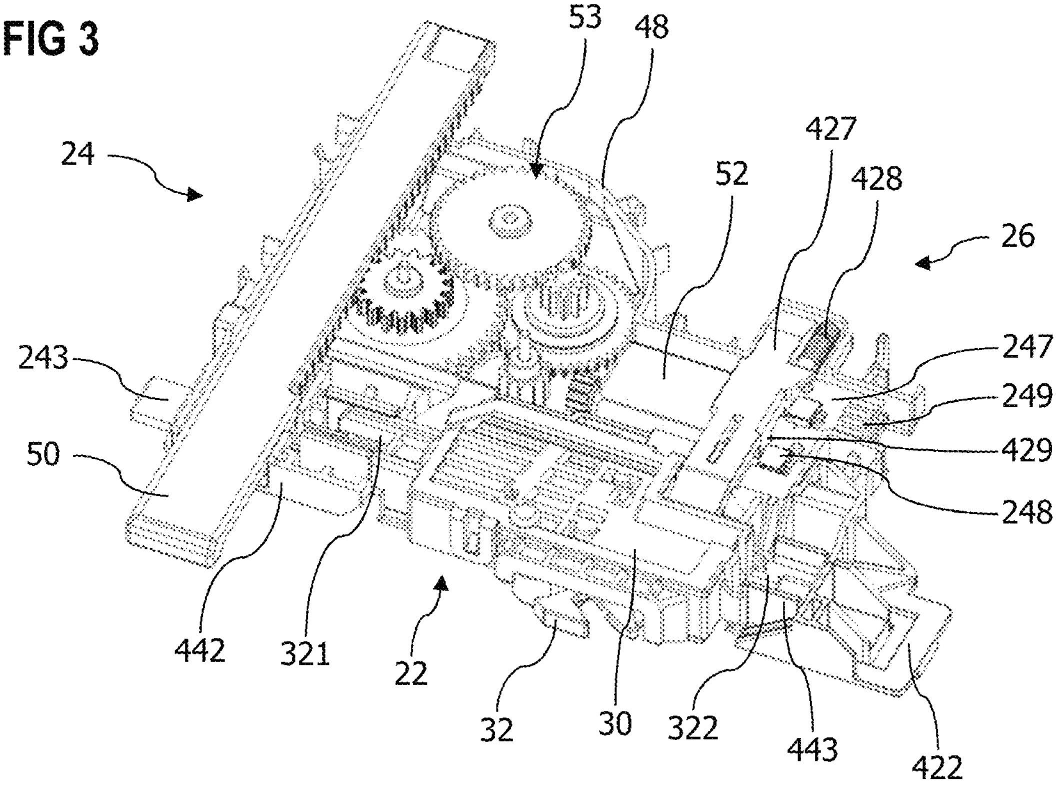
Figure 4:
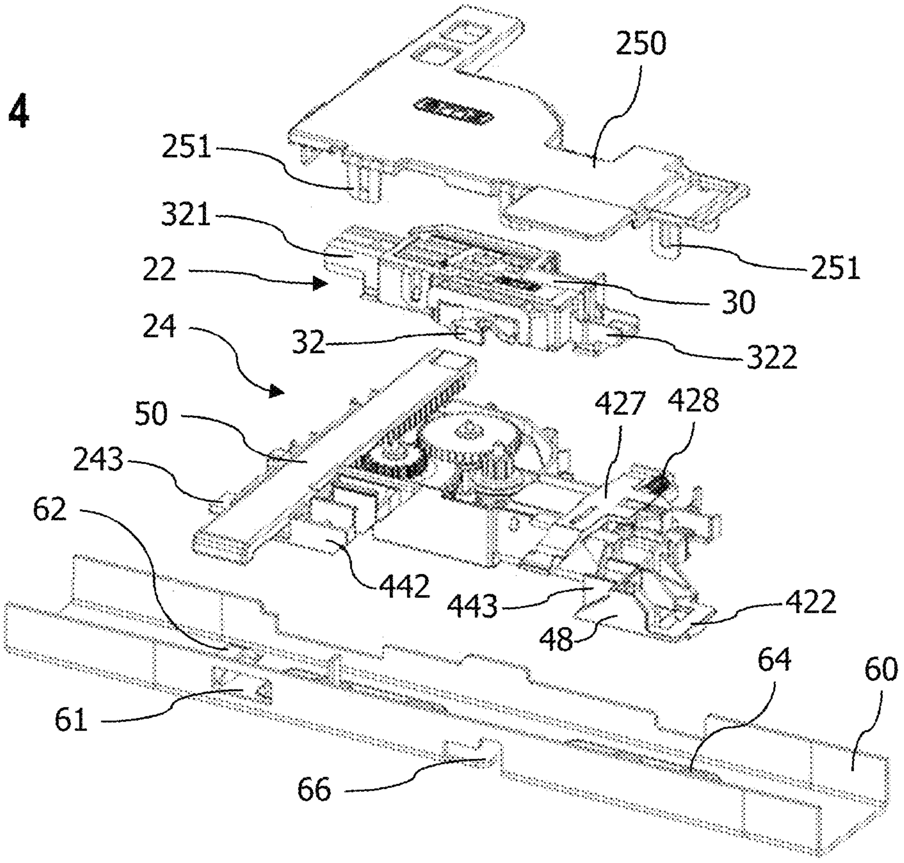

In the embodiment according to FIGS. 3 and 4, which show an exemplary mechanism 26 comprising a latch 22, as shown schematically in FIG. 2*a*. FIG. 3 schematically shows the mechanism 26 in a state in which the latch 22 is coupled to the opener 24, wherein the opener 24 is shown without a housing cover 250, and FIG. 4 schematically shows an exploded view of the mechanism 26 and a profile rail 60 to which the mechanism 26 can be attached.

The opener housing 48 has a coupling section 442, and the latch housing 30 also has a coupling section 321, wherein the respective coupling sections 321, 442 cooperate to provide a mechanical coupling of the opener housing and the latch housing. At least one of the coupling sections 321, 442 may form an arresting means. For example, the coupling section 442 of the opener housing 48 is shown in FIG. 4 as a pair of tabs or clamping hooks into which the coupling section 321 of the shutter housing 30 can be inserted (from above in FIG. 4) and engage. This locks the latch housing 30 in at least one direction (upwards in FIG. 4).

The latch housing 30 shown also has an optional further coupling section 322, which can be arranged, for example, on a side of the latch housing 30 opposite the (first) coupling section 321. Accordingly, the opener housing 48 also has a coupling section 443 into which the coupling section 322 of the latch housing 30 can be inserted and, for example, can engage therein. The coupling section 443 of the opener housing 48 is also shown in the form of a pair of tabs or clamping hooks.

The housing 30, 48 coupled in this way are mechanically connected to each other. In other words, the latch housing 30 can only be separated from the opener housing 48 if the respective coupling sections 321, 442, 322, 443 are released from each other. This can be done, for example, by releasing the arresting means. The two housings 30, 48 thus form a structural unit and can be attached to the household appliance 10 in the pre-assembled state.

For the fastening, at least one first fastening means 243 is provided on the opener housing 48, which is set up to fasten the mechanism 26 to the electrical household appliance 10 when the coupling sections 321, 442 (322, 443) of the opener housing 48 and the latch housing 30 are mechanically coupled. The at least one first fastening means 243 can be realised, for example, by mounting feet (not explicitly shown), which can be inserted into openings in the rail material in a rail base of the profile rail 60. By way of example only, the first fastening means 243 can comprise a lug, a clamping hook and/or a resilient locking tongue, which can engage and/or snap into the aperture in the profile rail or a corresponding slat or lug 62 in the profile rail 60. Further details on the attachment of the mechanism 26 to the profile rail 60 can be found, for example, in DE 10 2022 116 999 A1; the contents of this document (in particular, the details and associated explanations contained in FIGS. 3*a* and 3*b* of this document) are hereby incorporated by express reference into the present disclosure in their entirety.

The latch housing 30 is also attached to the profile rail 60 via the first fastening means 243.

Furthermore, the opener housing 48 may comprise at least one second fastening means 422 which is adapted to attach the mechanism 26 to the electrical household appliance 10 when the coupling sections 321, 442 (322, 443) of the opener housing 48 and the latch housing 30 are mechanically coupled. The second fastening means 243 can be designed in the same way as the first fastening means.

The latch housing 30 is also attached to the profile rail 60 via the second fastening means 243. If the first fastening means 243 and the second fastening means 422 are fastened to the profile rail 60, a two-point fixation of the mechanism 26 to the profile rail 60 can be realised, which enables a secure hold of the mechanism 26.

Since the latch housing 30 can be made independently of the opener housing 48, it can be made of a different material than the opener housing 48. Thus, to avoid or at least reduce friction between the rotary gripper 32 and the corresponding portions of the latch housing 30, a low-friction material, such as polyoxymethylene (POM), as well as polypropylene (PP), polyethylene (PE) or materials filled or coated with polytetrafluoroethylene (PTFE) or molybdenum disulphide ($MoS_2$) can be used to manufacture the latch housing 30.

On the other hand, the opener housing 48 may be made of a reinforced material, for example a glass fibre reinforced or mineral filled plastic. Such a reinforced material is suitable for absorbing high forces generated during the movement of the pusher 50. A reinforced material is particularly advantageous for accommodating the motor 52 (drive of the pusher 50), the gear unit 53 and the pusher 50.

In an advantageous embodiment, no electrical components are provided in the latch 22. This makes it possible to dispense with an electrical connection of the latch 22 and only the opener 24 has an electrical connection 249. Nevertheless, in order to be able to detect a closed state of the door 18, the opener 24 also has a door sensor 248. For example, the door sensor 248 can be arranged in the opener housing 48. In FIG. 3, for example, the door sensor 248 is shown arranged on a printed circuit board 247 for controlling the motor 52. The door sensor 248 is arranged to detect a state of the door 18, in particular whether the door 18 is in a latching position, in which the access opening 16 is tightly closed, or whether the door 18 is open (i.e., is not in the latching position). In this case, it may be sufficient for the door sensor 248 to detect an opening of the door 18 by a few millimetres or a few centimetres.

For this purpose, a movable element 427 is provided in the opener 24, which is set up to transmit a movement of the door 18 when the door 18 is closed to a section 429 of the movable element 427 cooperating with the door sensor 248. The section 429 cooperating with the door sensor 248 is shown as a projection and can, for example, cooperate with a door sensor 248 designed as a microswitch. The section 429 can, for example, switch the microswitch 248 back and forth between two positions.

In order to support this movement of the movable element 427, a spring element 428 can be provided which pushes the movable element 427 into a position which the movable element 427 can assume when the door 18 is open. If the door 18 is closed, the movable element 427 is moved (pushed) against the spring force of the spring 428 and can thus move the door sensor 248 into a position corresponding to the latching position of the door 18. For this purpose, the movable element 427 has a section coupled to the closing element 32, which is set up to mechanically transmit a movement of the closing element 32 to the section 429 cooperating with the door sensor 248 when the door 18 is closed. As shown in FIG. 2*a*, the closing element 32 is moved in the direction of movement 44 when the door 18 is closed. This movement can be transmitted to the movable element 427 by simple contact of the movable element 427 by the closing element 32.

The mechanism 26 also has a housing cover 250. This may in particular be associated with the opener 24. Of course, the housing cover 250 may also comprise a section covering at least part of the latch 22. The housing cover 250 can be attached to the opener housing 48 via latching tabs 251 or similar clamps.

The profile rail 60 can have further openings 61, 66 through which the pusher 50 can be moved or through which the counter-body 28 can engage with the closing element 32.

Figure 5:
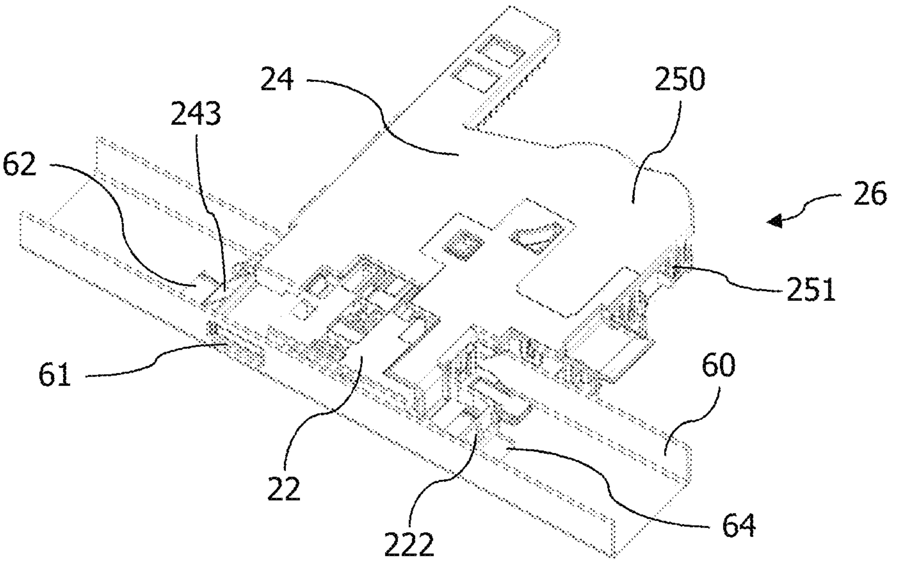
Figure 6:
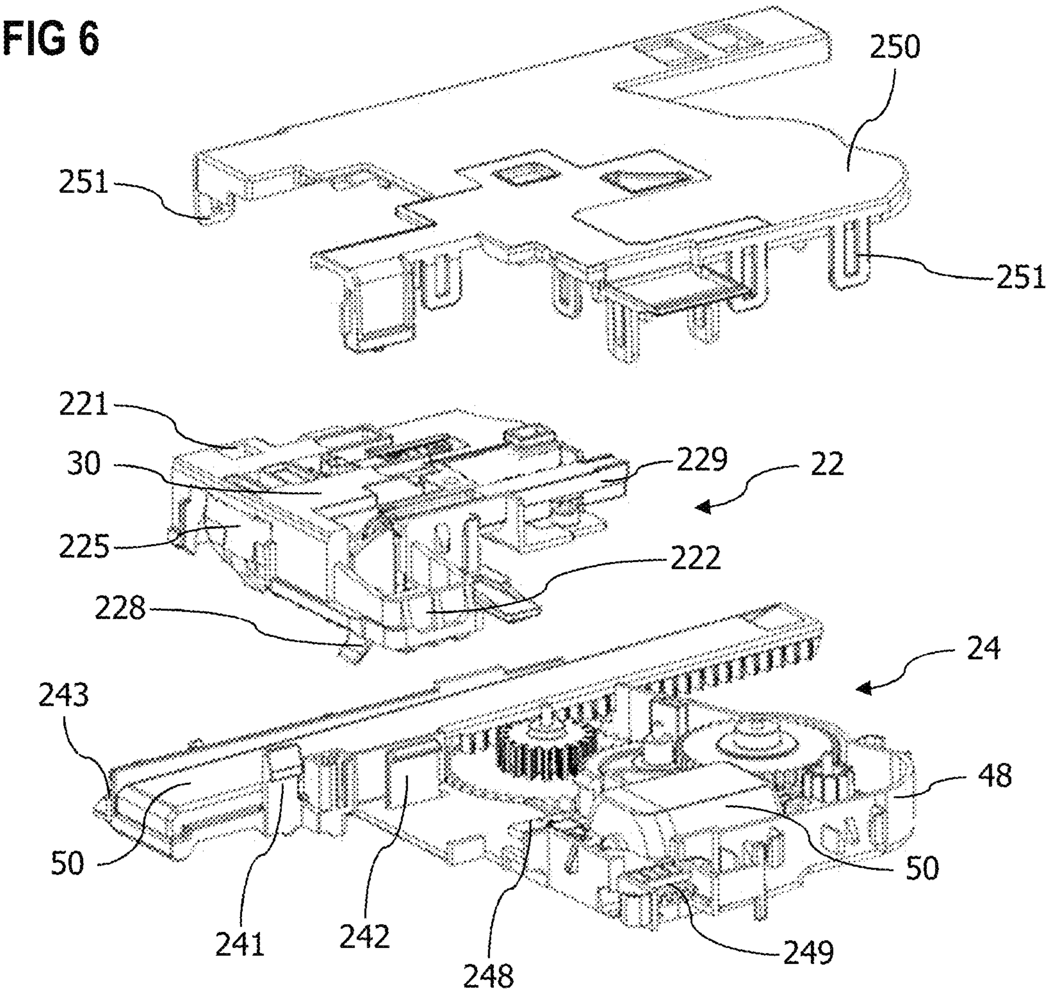
Figure 7:
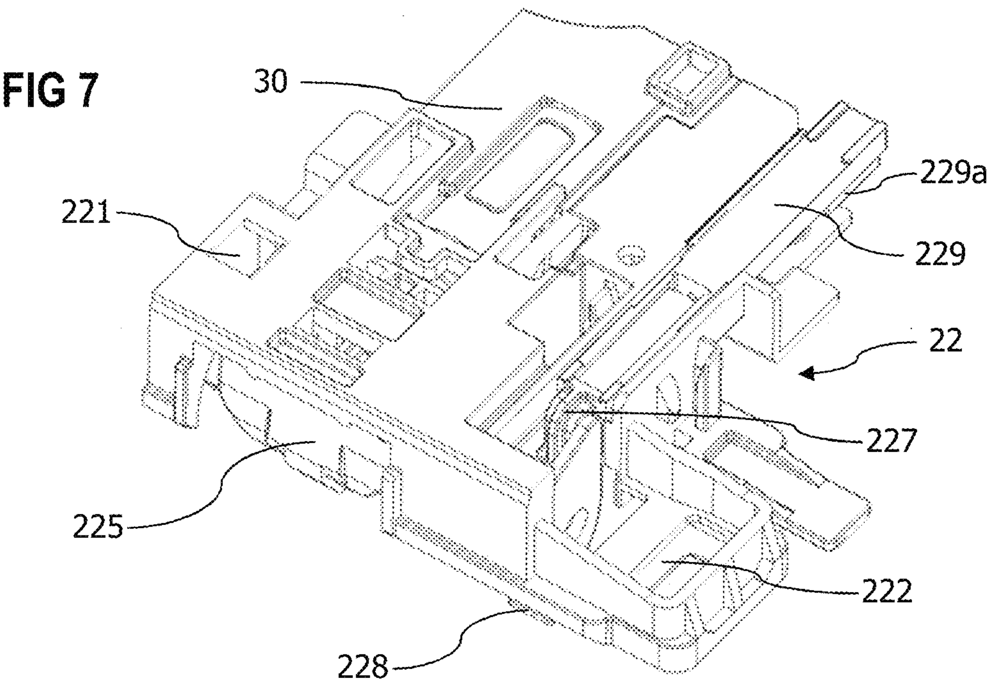
Figure 8:
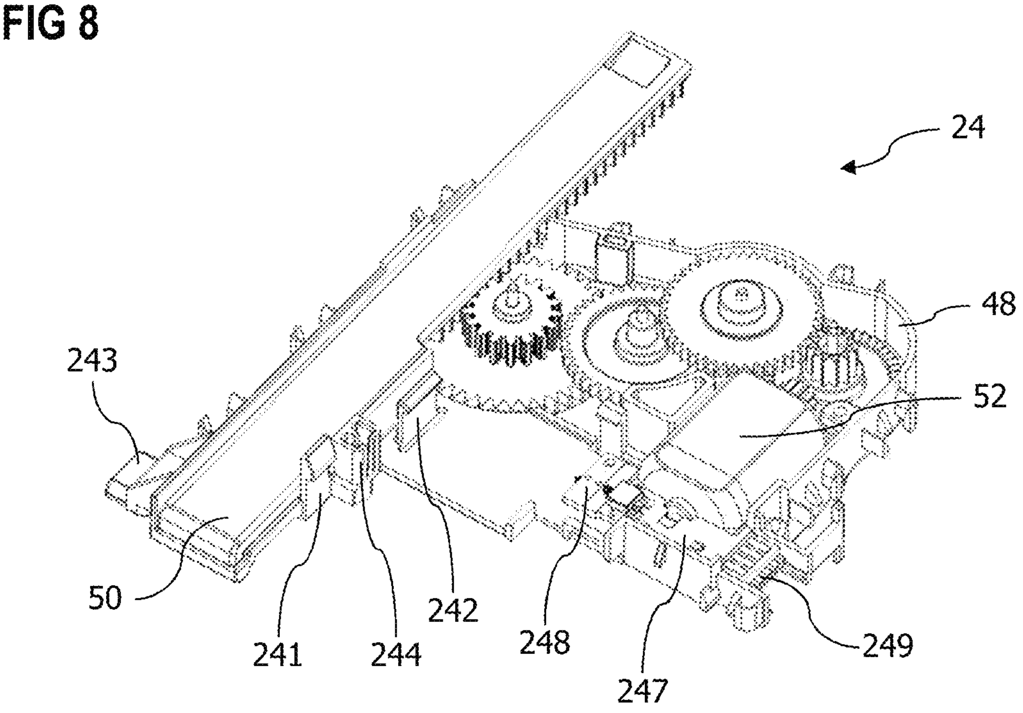

FIGS. 5 to 8 schematically show a further exemplary mechanism 26, wherein FIG. 5 schematically shows the mechanism 26 mounted in a profile rail 60, FIG. 6 schematically shows an exploded view of the mechanism 26, FIG. 7 schematically shows the latch 22, and FIG. 8 schematically shows the opener 24 with the cover 250 removed. Elements and components of the mechanism 26 which correspond to those in FIGS. 3 and 4 or are at least functionally equivalent are provided with identical reference signs. A description of these elements and components is not repeated here in order to avoid redundant explanations.

The exemplary mechanism 26 shown in FIGS. 5 to 8 has an elongate closing body 225 instead of a rotary gripper 32 (as in FIGS. 2*a*, 3, and 4), which engages with a front gripping nose in a recess formed on the door 18 (not explicitly shown) when the door 18 is closed. Such an elongate closing body 225 is guided within the latch housing 30. Therefore, a low-friction material for the latch housing 30 is particularly advantageous here, on the one hand to make it easier for a user to open and close the door 18, and on the other hand to make the latch 22 durable. The closing body 225, in particular its gripping nose, can be guided through an opening not shown in the figures (or not visible) in the bottom of the profile rail 60, so that the gripping nose can engage there in the recess of the door 18.

The latch 22 has at least one coupling section 221, which interacts with an associated coupling section 241 of the opener housing 48 to form a mechanical coupling. In the example shown, the coupling section 241 of the opener housing 48 is designed as a tab or catch that can engage in the coupling section 221 of the latch housing 30, which is formed as an opening or aperture. The coupling section 221 can also be arranged deeper in the latch housing 30, so that the coupling section 241 of the opener housing 48 does not protrude through the opening in the latch housing 30, but can be reached through the opening, for example to release it. The mechanical coupling thus takes place within the latch housing 30.

The opener housing 48 can optionally have a further coupling section 242, which can realise a mechanical coupling with an associated coupling section (not explicitly shown) in the latch housing 30. This can be done in the same or a similar way as between the coupling sections 221, 241.

Alternatively, or additionally, the opener housing 48 can also have a coupling section 244, which is implemented in the form of a rail. By means of a corresponding coupling section on the latch housing 30 (not visible in the figures), the latch housing 30 can be guided by a linear movement into the correct position for mechanical coupling between the latch housing 30 and the opener housing 48. Furthermore, the rail 244 allows further locking in at least one direction.

The latch housing 30 can be attached to the opener housing 48 via one or more coupling sections 221, 241 (242), so that both housings together form a pre-assembled assembly. The fastening to the profile rail 60 takes place via at least one first fastening means 243 on the opener housing 48 (see in particular FIGS. 6 and 8). This allows the mechanism 26 to be securely fastened to the electrical household appliance 10.

Furthermore, the latch housing 30 may comprise at least a third fastening means 222 which is adapted to secure the mechanism 26 to the electrical household appliance 10 when the coupling sections 221, 241 of the latch housing 30 and the opener housing 48 are mechanically coupled. If the first fastening means 243 and the third fastening means 222 are fastened to the profile rail 60, a two-point fixation of the mechanism 26 to the profile rail 60 can be achieved, which enables a secure hold of the mechanism 26.

In the embodiment shown in FIGS. 5 to 8, no electrical components are provided in the latch 22 either. As a result, an electrical connection of the latch 22 can be dispensed with and only the opener 24 has an electrical connection 249.

Optionally, a door sensor 248 can be arranged in the opener housing 48. In FIGS. 6 and 8, the door sensor 248 is shown arranged on a printed circuit board 247 for controlling the motor 52. The door sensor 248 is set up to detect a state of the door 18, in particular whether the door 18 is in a latching position, in which the access opening 16 is tightly closed, or whether the door 18 is open (i.e., is not in the latching position). In this case, it may be sufficient for the door sensor 248 to detect an opening of the door 18 by a few millimetres or a few centimetres.

For this detection by the door sensor 248, a movable element 229 is provided in the connection 22 in this embodiment, which is set up to transmit a movement of the door 18 when the door 18 is closed to a section 229*a* of the movable element 229 cooperating with the door sensor 248. The section 229*a* cooperating with the door sensor 248 is shown as an attachment or projection and can, for example, cooperate with a door sensor 248 designed as a microswitch (e.g., magnetic microswitch), light sensor, motion sensor, touch sensor, proximity sensor, or similar element. For example, the section 229*a* can be moved back and forth (perform a linear movement) that changes a state of the microswitch 248. This may include a magnet forming or disposed in the section 229*a* and having its position detected by the door sensor 248. Of course, any other element or material can be arranged on the section 229*a* that enables its position to be detected by the door sensor 248.

In order to transmit this movement of the door 18 to the movable element 229 during closing, the movable element has a rocker arm 228. The rocker arm 228 can be rotatably connected to the movable element 229 by a joint 227. The rocker arm 228 is rotatably mounted about an axis of rotation (not shown separately) arranged below the joint 227. A lower end of the rocker arm 228 can protrude through an aperture or opening provided in the bottom of the profile rails 60. There, the lower end of the rocker arm 228 is located in the opening 16, where the rocker arm 228 can be touched by an upper side of the door 18. During the closing process of the door 18, the lower end of the rocker arm 228 is moved in the direction of the tub 14. The rotary movement of the rocker arm 228 is transmitted to the movable element 229 via the joint 227. For example, the movable element 229 is moved (linearly) towards the door 18 when the door 18 is closed.

When the door 18 is opened, the movable element 229 can be returned to its initial position. For this purpose, the movable element 229 can be moved back via a spring (not shown separately) (i.e., moved away from the door 18). In other words, as soon as a movement space of the free end of the rocker arm 228 is released from the door 18, the spring can move the movable element 229 and thus also the rocker arm 228 back to its initial position (corresponding to an open position of the door 18). Of course, the rocker arm 228 can also be moved back to the initial position by a spring (for example, a torsion spring) (in addition to or as an alternative to a spring moving the movable element 229).

Furthermore, the section 229*a* of the movable element 229 cooperating with the door sensor 248 may also be provided in the opener 24 or in the opener housing 48. For the (linear) movement of the section 229*a* during closing and opening of the door 18, it can cooperate mechanically with a corresponding element in the latch 22 or in the latch housing 30. For example, the movable element 229 shown in FIGS. 6 and 7 may be divided (in two), with one part being arranged in the latch 22 or in the latch housing 30 and the other part being arranged in the opener 24 or in the opener housing 48. Alternatively, the part of the movable element 229 arranged or held in the opener 24 or in the opener housing 48 can also extend up to the rocker arm 228 and cooperate mechanically therewith. By way of example only, the rocker arm 228 can rest against the movable element 229 (i.e., only touch it) or be coupled to it via a joint.

Irrespective of the embodiment according to FIGS. 3 and 4 or 5 to 8, a possible sequence of events during assembly of the dishwasher 10 may be that the latch 22 is first inserted into the opener 24, in particular into the opener housing 48, and is mechanically coupled there to the opener 24 via the coupling sections (241, 242, 244, 321, 322, 442, 443), and may also be locked in place. In a later phase of the assembly process, the components coupled in this way (i.e., the assembled mechanism 26) are then installed in the top 24 of the washing tank 12.

What is claimed is:

1. A mechanism for a door of an electrical household appliance, comprising:

an opener configured to push open the door, the opener comprising an opener housing, a pusher accommodated in the opener housing, and a drive for the pusher, a latch configured to hold the door closed, wherein the latch comprises a latch housing and accommodated therein, at least one movably arranged closing element, wherein the at least one closing element is configured to engage and hold the door closed, with a counterbody approaching the closing element when the door is closed, wherein the latch is configured to be inserted into the opener housing, the opener housing and the latch housing each have a coupling section which co-operate to effect a mechanical coupling of the opener housing and the latch housing when the latch is inserted into the opener housing, and wherein the opener housing comprises at least a first fastening structure which is adapted to attach the mechanism to the electrical household appliance when the coupling sections of the opener housing and the latch housing are mechanically coupled, wherein the latch housing is configured to be attached to a profile rail of the electrical household appliance via the first fastening structure.

2. The mechanism according to claim 1, wherein the drive is an electric motor drive.

3. The mechanism according to claim 1, wherein the opener housing and the latch housing are made of different materials.

4. The mechanism according to claim 3, wherein the opener housing comprises a reinforced material; and/or the latch housing comprises a low-friction material.

5. The mechanism according to claim 4, wherein the reinforced material comprises a glass fiber-reinforced material.

6. The mechanism according to claim 4, wherein the low-friction material comprises polyoxymethylene.

7. The mechanism according to claim 1, wherein at least one of the coupling sections comprises an arresting structure.

8. The mechanism according to claim 7, wherein the at least one of the coupling sections comprises an undercut, tab, catch, rail, and/or a clamping hook.

9. The mechanism according to claim 1, wherein the opener housing comprises at least a second fastening structure adapted to attach the mechanism to the electrical household appliance when the coupling sections of the opener housing and the latch housing are mechanically coupled;

the latch housing has at least a third fastening structure adapted to fasten the mechanism to the electrical household appliance when the coupling sections of the opener housing and the latch housing are mechanically coupled;

the opener housing and the latch housing each have a further coupling section, which co-operate to effectuate a further mechanical coupling of the opener housing and the latch housing.

10. The mechanism according to claim 1, further comprising a door sensor disposed in the opener housing, wherein the latch or the opener comprises a movable element adapted to transmit a movement of the door to a section of the movable element cooperating with the door sensor when the door is closed.

11. The mechanism according to claim 10, wherein:

the movable element comprises a rocker arm and/or a slider; and the section of the movable element cooperating with the door sensor is arranged in a region of the latch housing facing away from the door.

12. The mechanism according to claim 10, wherein the movable element comprises:

a section coupled to the closing element, which is set up to mechanically transmit a movement of the closing element to the section co-operating with the door sensor when the door is closed, or a portion protruding from the latch housing adapted to mechanically transmit a movement of the door to the portion co-operating with the door sensor when the door is closed.

13. The mechanism according to claim 1, wherein:

the latch comprises no electrical and/or electronic components; and only the opener comprises an electrical connection.

14. The mechanism according to claim 1, wherein the latch has a function for mechanically influencing at least one movement feature of the pusher.

15. The mechanism according to claim 14, wherein in having the function for mechanically influencing at least one movement feature of the pusher, the latch has a function for mechanically releasing a movement blocking of the pusher.

16. The mechanism according to claim 1, the pusher is configured for a linear push-open movement, and the drive comprises an electric motor drive.

* * * * *